United States Patent

Umney et al.

[11] Patent Number: 6,012,684
[45] Date of Patent: *Jan. 11, 2000

[54] BRAZE BRACKET FOR A TURBINE ENGINE

[75] Inventors: Michael A. Umney, Mason; Douglas E. Vann, Tipp City, both of Ohio

[73] Assignee: General Electric Company, Cincinnati, Ohio

[ * ] Notice: Under 35 U.S.C. 154(b), the term of this patent shall be extended for 459 days.

[21] Appl. No.: 08/772,958

[22] Filed: Dec. 24, 1996

[51] Int. Cl.$^7$ ...................................................... F16L 3/00
[52] U.S. Cl. .............................................................. 248/65
[58] Field of Search ........................... 248/65, 68.1, 300, 248/73, 80, 554, 555

[56] References Cited

U.S. PATENT DOCUMENTS

| | | | |
|---|---|---|---|
| 2,834,566 | 5/1958 | Bower | 248/300 X |
| 3,285,552 | 11/1966 | Becker | 248/68.1 |
| 3,638,890 | 2/1972 | Burrell et al. | 248/215 |
| 4,433,821 | 2/1984 | Bolding et al. | 248/65 |
| 5,427,339 | 6/1995 | Pauli et al. | 248/75 |

*Primary Examiner*—Ramon O. Ramirez
*Attorney, Agent, or Firm*—Andrew C. Hess; Rodney M. Young

[57] ABSTRACT

Braze brackets utilized in connection with securing tubes and ducts to turbine engines are described. In one embodiment, the bracket includes a mounting plate having a curved braze surface. A plurality of tangs extend from the mounting plate. The specific dimensions for the braze surface and the tangs are selected depending upon the duct or tube to which the bracket is to be secured and the main bracket body to be used in connection with the bracket. In one embodiment, the curved braze surface has a semi-cylindrical geometric shape, and the tangs extend substantially radially from edges of the braze surface. The tangs are spaced along the edges of the braze surface.

11 Claims, 1 Drawing Sheet

BRAZE BRACKET FOR A TURBINE ENGINE

FIELD OF THE INVENTION

This invention relates generally to turbine engines for aircraft and more particularly, to brackets configured for being secured to engine tubes and ducts.

BACKGROUND OF THE INVENTION

Bracket assemblies presently are utilized for supporting tube, ducts, cables and controls on an aircraft engine. The bracket assemblies are fabricated as separate sub-assemblies, and the sub-assemblies are then welded together to form the bracket assembly. The bracket assembly includes a braze surface which is brazed to an engine tube or duct, and the assembly can be secured to the engine.

As a result of the bracket assembly fabrication process, the bracket assembly braze surface may be deformed. For example, when welding the sub-assemblies together, the braze surface may become extremely hot and deform. Such deformations may prevent forming a good braze between the bracket assembly and the engine tube or duct. Of course, providing a good fit between the bracket assembly and the engine tube or duct is important due to the operational environment, and therefore, a weak braze typically must be corrected. Fixing a braze generally involves reworking the braze surface, and possibly even adjusting, e.g., bending, some of the braze sub-assemblies so that a good fit is obtained. Such work is time consuming and cumbersome.

In addition, when brazing the bracket assembly to an engine tube or duct, the tube or duct may be distorted due to the heat generated during the brazing process. Any deformation in the tube or duct may cause the bracket to move, which results in moving the interface points on the bracket out of position. To ensure good support, the bracket typically must be moved back to the desired position, which adds additional assembly time.

It would be desirable to substantially, if not totally, eliminate the time consuming and cumbersome work associated with braze surface distortions in such brackets. It also would be desirable to substantially, if not totally, eliminate the possibility for distortion of the tube and ducts which may occur when brazing a bracket to the tube or duct.

SUMMARY OF THE INVENTION

These and other objects may be attained by a braze bracket which provides the important advantage that very little processing, and no welding, is required in fabrication and therefore, the contour of the braze bracket braze surface can be maintained within very limited tolerances. By keeping the braze surface within very limited tolerance, the bracket is easily fit to a duct or tube with a good braze joint.

More specifically, and in one embodiment, the bracket includes a mounting plate having a curved braze surface. A plurality of tangs extend from the mounting plate. The specific dimensions for the braze surface and the tangs are selected depending upon the duct or tube to which the bracket is to be secured and the main bracket body to be used in connection with the bracket. In one embodiment, the curved braze surface has a semi-cylindrical geometric shape, and the tangs extend substantially radially from edges of the braze surface. The tangs are spaced along the edges of the braze surface.

To secure a tube or a duct to an aircraft engine with the braze bracket, the bracket is first brazed to the tube or duct. Since very little processing, and no welding is required to fabricate the bracket, the braze surface can be maintained within very limited tolerances. By maintaining the braze surface within limited tolerances, a very tight fit can be formed between the braze surface and the tube or duct, and a good braze joint can be formed.

Once the braze bracket is secured to the tube or duct, the main bracket body is attached to braze bracket at the braze bracket tangs. The specific geometric configurations of the main bracket body can vary widely depending upon the location at which the main bracket body is to be secured to the engine. The main bracket body is secured to the tangs by, for example, welds, rivets, or bolts. Once the main bracket body is secured to the braze bracket, then the assembly is secured to the aircraft engine.

The above described braze bracket facilitates substantially, if not totally, eliminating the time consuming and cumbersome work associated with braze surface distortions in known brackets. The above described bracket also facilitates substantially, if not totally, eliminating the possibility for distortion of the tube and ducts which may occur when brazing known brackets to an engine tube or duct.

DETAILED DESCRIPTION OF THE DRAWINGS

Figure 1:
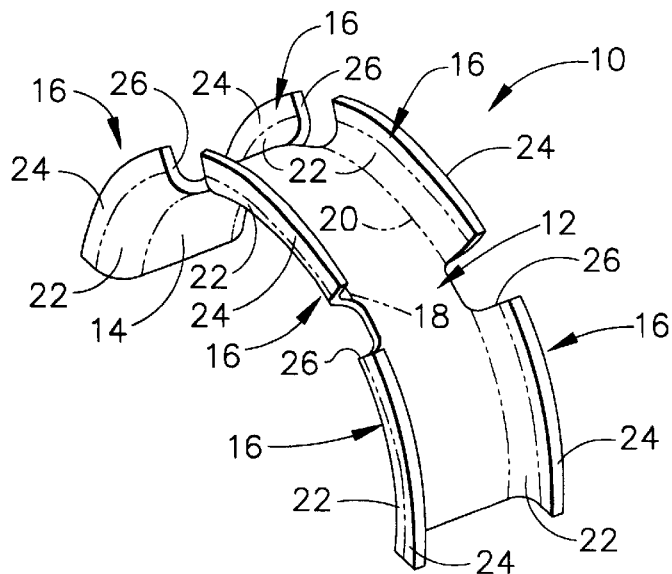
FIG. 1 is a perspective view of a braze bracket in accordance with one embodiment of the present invention.

FIG. 1 is a perspective view of a braze bracket 10 in accordance with one embodiment of the present invention. Braze bracket 10, as described hereinafter in more detail, provides the important advantage that very little processing, and no welding, is required in fabrication and therefore, the braze surface contour can be maintained within very limited tolerances. By keeping the braze surface within a very limited tolerance, bracket 10 is easily fit to a duct or tube with a good braze joint.

Referring specifically to FIG. 1, bracket 10 includes a mounting plate 12 having a curved braze surface 14. A plurality of tangs 16 extend from mounting plate 12. The specific dimensions for braze surface 14 and tangs 16 can be selected depending upon the duct or tube to which bracket 10 is to be secured and the main bracket body to be used in connection with bracket 10, as described below. Curved braze surface 14 has a semi-cylindrical geometric shape, and tangs 16 extend substantially radially from edges 18 and 20 of braze surface 14.

Each tang 16 includes a curved, lower portion 22 and a substantially planar, upper portion 24. Such configuration facilitates welding tangs 16 to the main bracket body as described below. Mounting plate 12 is integral with tangs 16.

Figure 2:
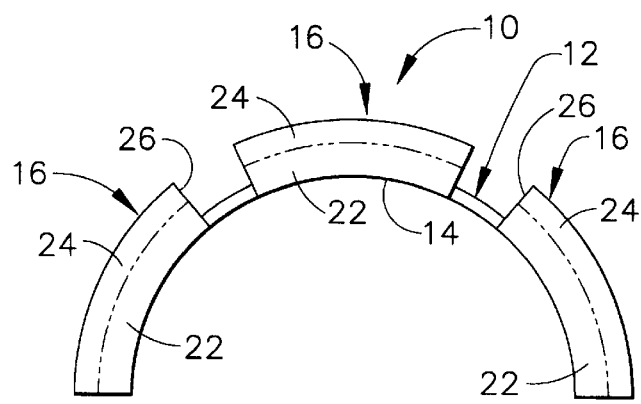
FIG. 2 is a front view of the braze bracket shown in FIG. 1.

FIG. 2 is a front view of the braze bracket shown in FIG. 1. Tangs 16 are spaced and gaps 26 are located between spaced tangs 16. Braze bracket is fabricated by stamping and bending sheet metal to the general configuration shown in FIGS. 1 and 2.

In utilizing braze bracket 10, bracket 10 is first brazed to the tube or duct to be secured to the turbine engine. Since very little processing, and no welding, is required to fabricate bracket 10, braze surface 14 can be maintained within very limited tolerances. By maintaining braze surface 14 within limited tolerances, a very tight fit can be formed between braze surface 14 and the tube or duct, and good braze joint can be formed.

Once braze bracket 10 is secured to the tube or duct, the main bracket body is attached to braze bracket 10 at braze bracket tangs 16. The specific geometric configurations of the main bracket body can vary widely depending upon the location at which the main bracket body is to be secured to the engine. The main bracket body is secured to tangs 16 by, for example, welds, rivets, or bolts. Once the main bracket body is secured to braze bracket 10, then the assembly can be secured to the engine.

Braze bracket 10 facilitates substantially, if not totally, eliminating the time consuming and cumbersome work associated with braze surface distortions in known brackets. Bracket 10 also facilitates substantially, if not totally, eliminating the possibility for distortion of the tube and ducts which may occur when brazing known brackets to an engine.

Figure 3:
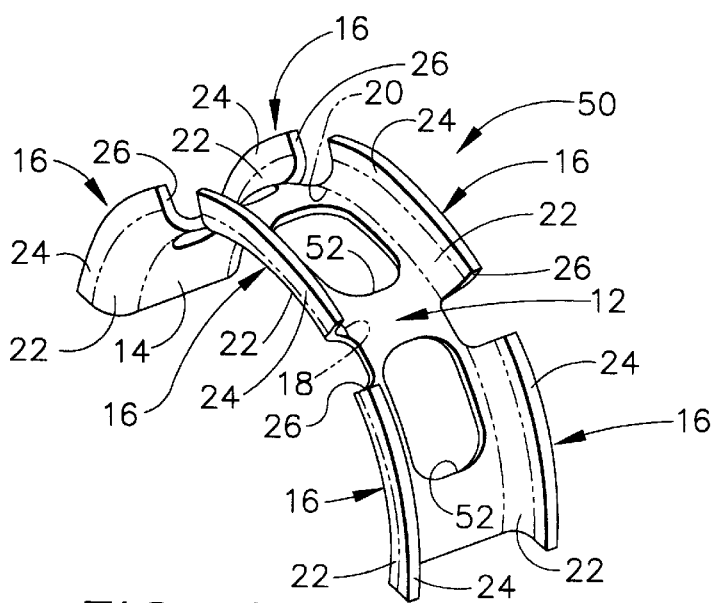
FIG. 3 is a perspective view of a braze bracket in accordance with another embodiment of the present invention.

FIG. 3 is a perspective view of a braze bracket 50 in accordance with another embodiment of the present invention. Braze bracket 50 is identical to bracket 10 shown in FIGS. 1 and 2 except that lightening openings 52 are provided in mounting plate 12. Such lightening openings 52 provide that bracket 50 is lighter weight than bracket 10, which may be important in some applications. Openings 52 also enable visual inspection of the braze between bracket 50 and the tube or duct.

Of course, many variations of brackets 10 and 50 are possible. For example, the geometric configuration, location and number of tangs 16 are selected based upon the main bracket body to be used. Many other geometric configurations are possible, and the locations and the number of tangs 16 can vary widely.

From the preceding description of various embodiments of the present invention, it is evident that the objects of the invention are attained. Although the invention has been described and illustrated in detail, it is to be clearly understood that the same is intended by way of illustration and example only and is not to be taken by way of limitations. Accordingly, the spirit and scope of the invention are to be limited only by the terms of the appended claims.

What is claimed is:

1. A braze bracket for being brazed to a tube or a duct member of an aircraft engine, said bracket comprising:

a mounting plate having a curved braze surface, said braze surface closely conforming to an outer surface of the member to form a tight fit therewith, said braze surface said braze surface having a semi-cylindrical geometric shape;

a plurality of tangs extending from said mounting plate, said tangs extending substantially radially from said curved braze surface and spaced along at least one edge of said braze surface.

2. A braze bracket in accordance with claim 1 wherein said bracket is sheet metal.

3. A braze bracket in accordance with claim 1 wherein said mounting plate is integral with said tangs.

4. A braze bracket in accordance with claim 1 further comprising at least one opening in said mounting plate.

5. A braze bracket for securing a tube or a duct member to a turbine engine, said bracket comprising:

a mounting plate having a curved braze surface selected to have a contour substantially conforming to a contour of the member, said mounting plate braze surface being brazed to the member, said curved braze surface having a semi-cylindrical geometrical shape; and a plurality of tangs extending from said mounting plate, said tangs being spaced along at least one edge of said brazed surface and extending substantially radially from said curved braze surface.

6. A braze bracket in accordance with claim 5 wherein said bracket is sheet metal.

7. A braze bracket in accordance with claim 5 wherein said mounting plate is integral with said tangs.

8. A braze bracket in accordance with claim 5 further comprising at least one opening in said mounting plate.

9. A braze bracket for securing a member to a turbine engine, said bracket comprising:

a mounting plate having a curved braze surface selected to have a contour substantially conforming to a contour of the member, said curved braze surface having a semi-cylindrical geometric shape and configured to form a tight fit with the member so that said braze surface can be brazed thereto, said braze bracket comprising at least one opening in said mounting plate; and a plurality of tangs extending from said mounting plate, said tangs extend substantially radially from said curved braze surface, said tangs being integral with said mounting plate.

10. A braze bracket in accordance with claim 9 wherein said tangs are spaced along at least one edge of said braze surface.

11. A braze bracket in accordance with claim 9 wherein said bracket is sheet metal.

\* \* \* \* \*

UNITED STATES PATENT AND TRADEMARK OFFICE
CERTIFICATE OF CORRECTION

PATENT NO. : 6,012,684　　　　　　　　　　　　　　　　　　　　　Page 1 of 1
DATED : January 11, 2000
INVENTOR(S) : Umney et al.

It is certified that error appears in the above-identified patent and that said Letters Patent is hereby corrected as shown below:

Title page,
[*] delete "459" and insert -- 0 --.

Signed and Sealed this

Sixteenth Day of October, 2001

Attest:

NICHOLAS P. GODICI
Attesting Officer　　Acting Director of the United States Patent and Trademark Office